(No Model.) 2 Sheets—Sheet 1.

A. J. DOWNES.
SEAT OR SADDLE FOR BICYCLES.

No. 591,330. Patented Oct. 5, 1897.

Witnesses:
G. D. Goodwin
F. E. Bechtold

Inventor:
Andrew J. Downes
by his Attorneys
Howson & Howson (No Model.) 2 Sheets—Sheet 2.
A. J. DOWNES.
SEAT OR SADDLE FOR BICYCLES.
No. 591,330. Patented Oct. 5, 1897.
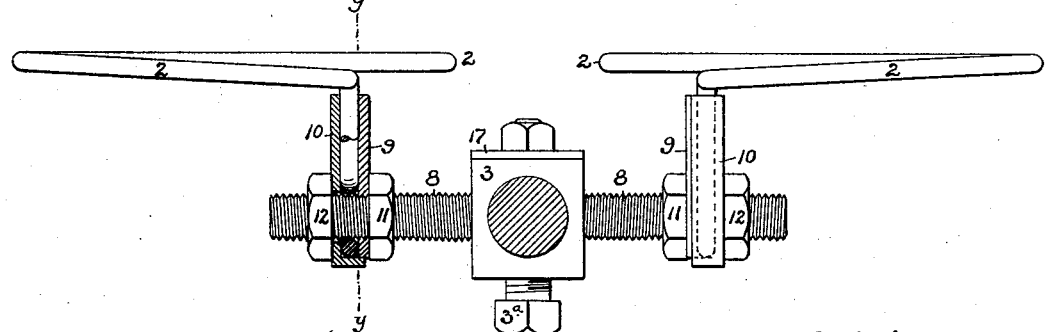
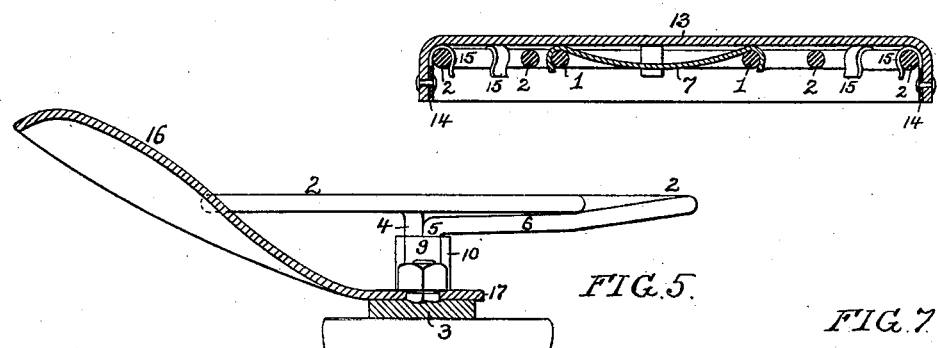
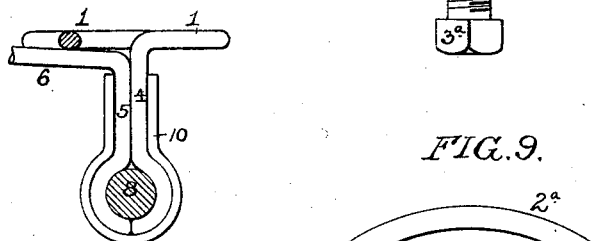
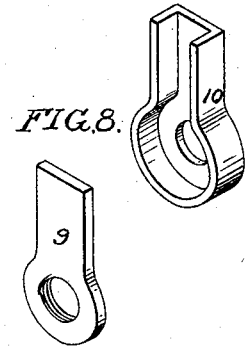
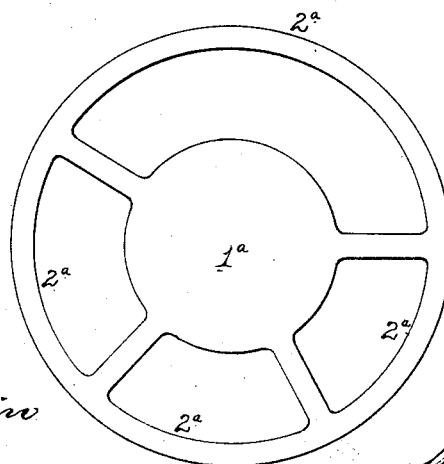
Witnesses:
F. D. Goodwin
F. E. Bechtold
Inventor:
Andrew J. Downes
by his Attorneys
Howson & Howson

UNITED STATES PATENT OFFICE.

ANDREW J. DOWNES, OF PHILADELPHIA, PENNSYLVANIA.

SEAT OR SADDLE FOR BICYCLES.

SPECIFICATION forming part of Letters Patent No. 591,330, dated October 5, 1897.

Application filed July 24, 1896. Serial No. 600,372. (No model.)

*To all whom it may concern:*

Be it known that I, ANDREW J. DOWNES, a citizen of the United States, residing in Philadelphia, Pennsylvania, have invented certain Improvements in Seats or Saddles for Bicycles, &c., of which the following is a specification.

The object of my invention is to so construct a seat or saddle for bicycles and other purposes that proper attention is paid to hygienic requirements and the seat or saddle can be used with comfort to the rider. This object I attain in the manner hereinafter set forth, reference being had to the accompanying drawings, in which—

Figure 1:
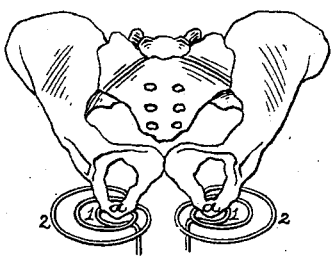
Figure 2:
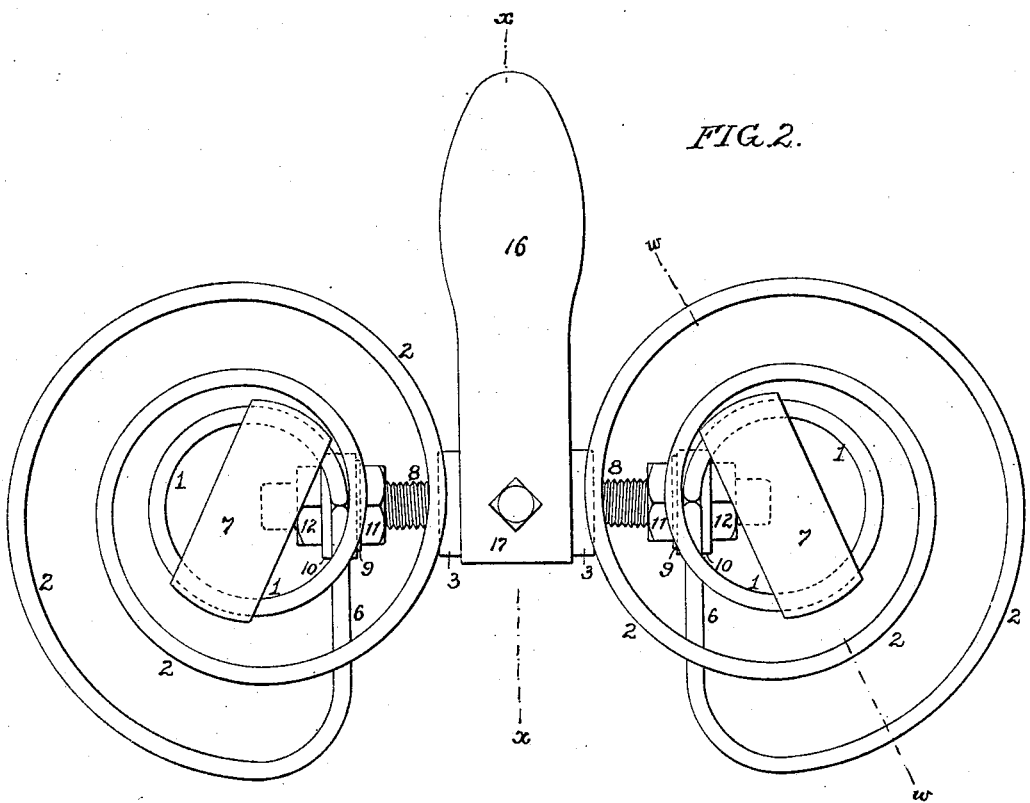
Figure 10:

Figure 1 is a diagram showing the framework of my improved saddle in its relation to the human pelvis. Fig. 2 is a plan view of the seat or saddle with the coverings of the seats removed therefrom. Fig. 3 is a rear view of the seat or saddle likewise without the seat-coverings. Fig. 4 is a sectional view of one of the seats of the saddle on the line $w\ w$, Fig. 2, and showing the covering applied. Fig. 5 is a sectional view on the line $x\ x$, Fig. 2. Fig. 6 is a sectional view on the line $y\ y$, Fig. 3. Figs. 7 and 8 are perspective views of the securing devices for the seats of the saddle, and Figs. 9 and 10 are views showing modifications of the invention.

Before proceeding to describe my improved saddle it may be well to state that the human body in a sitting posture is supported by those portions of the pelvis known to anatomists as the "tuberosities of the ischia," these points being indicated at $a\ a$ in Fig. 1. Between these are situated the perineal and anal regions, containing many important organs and structures liable to injury or congestion, tending to produce lasting and often permanent ill effects. Hence all forms of saddles which are under tension in the center from front to rear are highly objectionable because of the pressure upon and heating of these delicate organs which are inseparable from the use of such a saddle, while in those saddles which have separated elastic seats there is in most if not in all cases transverse tension across the anal region and liability to congestion due to pressure and heat. This applies especially to the so-called "resilient" type of saddle having opposite supports or seats of wire so disposed that the points of support are depressed by the weight upon them, as such depression causes a virtual rising of the external edges of the seat and the pommel, and consequently pressure on the parts resting upon them.

From the foregoing it will appear that a perfect saddle for a bicycle should be composed of two independent seat portions—that is to say, portions with no connection between them except the bar by which they are mounted upon the saddle-post, the saddle being also without a pommel, or at any rate with a pommel of such character that it will not press upon the delicate organs when the rider is in normal riding position. The points of support for the fleshy tissue immediately under the tuberosities of the ischia should be unyielding, or comparatively so, but the remainder of the saddle, beginning immediately beyond the said unyielding or substantially rigid portion, should yield readily to the natural movements of the thighs and buttocks while the legs are in motion or at rest. The space between the opposite seats of the saddle should be open and unobstructed, so as to avoid any pressure upon the perineal and anal regions, and the two seats should by preference also be mounted so as to be adjustable laterally to suit different riders, there being slight differences of distance between the tuberosities of the ischia in different individuals and a somewhat greater difference between those of the male and female. The opposite seats should, furthermore, be mounted so that they may at will be tilted longitudinally, and it is also desirable that the main supporting portions of the seats should be slightly dished or concaved, so as to prevent slipping in any direction.

My improved saddle has therefore been devised with the view of embodying these desirable features, and I will now proceed to describe the same.

Each of the opposite supporting portions or seats of the saddle is composed by preference of a coiled wire having an internal coil 1 of comparatively small diameter and one or more convolutions 2 around the same, the inner coil being such as to be substantially unyielding to vertical pressure and the two seats being so mounted upon the supporting bar or yoke that these inner coils are separated to the same extent as the centers of the tuberosities of the ischia of a normal adult. The opposite ends of the wire forming the coil are brought together and carried downward, as shown at 4 and 5, for attachment to the supporting-bar, and under ordinary circumstances the small diameter of the inner coil 1 and its proximity to the supporting-leg formed by these downward terminations 4 and 5 of the wire will insure its proper rigidity, but this may, if desired, be further increased by carrying the inwardly-extending portion 6 of the final convolution under the inner coil, as shown in Fig. 2, before bending the same downward. Rigid or substantially rigid supports for the fleshy tissues immediately below the tuberosities are thus provided, and in order to limit the extent of penetration of these portions of the person into the coils 1 each of the latter may be provided with a transverse strap or metal band 7, concaved or bent downward to the desired extent and crossing the coil 1 preferably at an angle corresponding with the lateral flare of the tuberosities. The outer convolutions of each coil, while stiff enough to provide proper support for those parts of the person resting upon them, are at the same time elastic enough to rise and fall with the movements of these parts, so that chafing or soreness due to pressure exerted by these outer portions of the seats is effectually prevented.

The supporting bar or yoke of the saddle consists of the central block 3, having an opening through it for the reception of the usual horizontal bar of the saddle-post, to which it may be secured by means of a set-screw $3^a$. Projecting from each side of this block is a threaded stem 8, and upon each of these stems is mounted a pair of washers 9 and 10 and a pair of nuts 11 and 12, the nut 11 bearing upon the inner washer 9 and the nut 12 upon the outer washer 10.

The lower ends of the depending portions 4 and 5 of the coiled wire constituting each seat of the saddle are bent around the threaded stems 8 so as to abut, the washers 10 being cupped or dished to receive the coils thus formed and being also carried upward for the reception of the portions 4 and 5 of the wire. The washers 9 are constructed to fit into the washers 10, as shown in Fig. 3. Hence when the washers are forced together by means of the nuts 11 and 12 they will tightly clamp the wires 4 and 5 between them and will thus securely retain each of the seats of the saddle in position. The use of the washers and nuts, however, permits of ready lateral adjustment of the seats from and toward each other and also of the tipping or tilting of either seat longitudinally to accord with the wishes of the rider. The upwardly-extending portions of the washers serve to stiffen or increase the rigidity of the vertical legs of the seats formed by the runs 4 and 5 of the wire composing the same. A cover 13 is preferably provided for each of the wire coils constituting the seats of the saddle, this cover being composed of leather, cloth, woven wire, cane, perforated sheet metal, or other available material, padded or not, as desired, and as a means of securing the cover to the wire coil I prefer to use a ring 14, to which the depending or downwardly-bent outer edge of the cover is secured by tacks, stitches, rivets, or any other suitable means, this ring 14 having any desired number of spring-clips 15 for fitting over the outer convolution of the coil, such an attaching device providing for the ready application and the equally ready removal of the cover.

It will be observed that the opposite seats are separated from each other for a considerable distance and even when the seats are adjusted to adapt them to a pelvis of the smallest size this space between the seats will be ample to prevent any pressure upon the perineal or anal region or portions adjacent thereto, the latter resting, if at all, upon the yielding inner portions of the convolutions of the coils. The saddle has no permanent nose or pommel, and for riders of ordinary skill no such nose or pommel is needed. For the use of timid riders, however, or those learning to ride, I provide a detachable pommel 16, preferably in the form of a sheet-metal plate of suitable configuration, having a shank 17, adapted to be bolted upon the top of the block 3. When the rider is properly seated upon the saddle, this pommel has no bearing upon any part of the person, its function being simply to provide a support should the rider be accidentally thrown forward from the seat and to prevent lateral slipping of the rider to one side or the other. The pommel is, therefore, by preference of such elasticity that it can yield slightly when subjected to pressure.

It will be noted that my improved saddle is essentially distinct from that form of saddle which has a wire bent so as to form opposite coils connected by a projecting nose or pommel and having the portions of greatest elasticity at the main points of support, for such saddle is most elastic at the very point where I design my saddle to be most rigid and is least elastic where mine has the greatest elasticity. In such a saddle the depression of the inner portions of the coils causes a virtual rise of the outer convolutions and of the pommel or nose, and thus causes pressure upon some of the parts which my improved saddle relieves from pressure.

I do not broadly claim, therefore, a saddle having a seat portion composed of coiled wires, nor is my invention limited to the use of coiled wires for the seat-frames, since plates of metal having substantially rigid portions $1^a$, corresponding to the inner coils 1, and elastic or yielding portions $2^a$, corresponding to the outer convolutions 2, may be used in place of the wire coils in carrying out my invention, as shown, for instance, in Fig. 9.

When slight resiliency of the seats of the saddle is desired, a bar having a curved central portion secured to the block 3 may take the place of the threaded stems 8, as shown in Fig. 10.

Having thus described my invention, I claim and desire to secure by Letters Patent—

1. A seat or saddle for bicycles, &c., having opposite supporting portions or seats substantially rigid against vertical pressure at points corresponding with the tuberosities of the ischia of a normal adult and in which said tuberosities individually rest, said seats having elastic portions beginning immediately beyond the substantially rigid portions, substantially as specified.

2. A seat or saddle for bicycles, &c., comprising opposite supporting portions or seats disconnected from each other and having no connection with the nose or pommel, but presenting portions rigid against vertical pressure at points corresponding to the tuberosities of the ischia of a normal adult and in which said tuberosities individually rest, said seats being elastic beyond said rigid supporting portions, substantially as specified.

3. A seat or saddle for bicycles, &c., having opposite supporting portions or seats each composed of wire bent to form an inner coil or loop of small diameter, substantially rigid against vertical pressure and forming a support for one of the tuberosities of the ischia of the rider, and outer convolutions yielding to pressure, substantially as specified.

4. A seat or saddle for bicycles, &c., consisting of opposite supporting portions or seats each composed of an inner coil of small diameter substantially rigid against vertical pressure and forming a support for one of the tuberosities of the ischia of the rider, and outer convolutions yielding to pressure, the terminals of the wire being bent downward to form a vertical supporting-leg adjacent to said inner coil, substantially as specified.

5. A seat or saddle for bicycles, &c., consisting of opposite supporting portions or seats each composed of wire bent to form an inner coil of small diameter, and outer vertically-elastic convolutions, the terminals of the wire being bent downward so as to form a vertical supporting-leg, and the outermost convolution terminating in a portion extending inwardly so as to provide a vertical support for the inner coil, substantially as specified.

6. A seat or saddle for bicycles, &c., comprising opposite independent and disconnected supporting portions or seats each having a downwardly-extending leg terminating in an eye, an attaching-bar having projecting threaded stems passing through said eyes, and nuts adapted to said threaded stems and flanking each of the legs of the seats, whereby the latter can be adjusted laterally on the projecting stems and secured in position thereon after adjustment, substantially as specified.

7. A seat or saddle for bicycles, &c., having opposite supporting portions or seats with downwardly-projecting legs having eyes at their lower ends, an attaching-block having laterally-projecting threaded stems passing through said eyes, and washers recessed for the reception of the eyes of the legs and extending upward so as to inclose said legs, substantially as specified.

8. A bicycle seat or saddle having opposite disconnected supporting portions or seats each with downwardly-projecting leg terminating in an eye, an attaching device having laterally-threaded stems passing through said eyes, washers mounted on said stems and cupped or recessed for the reception of the legs of the seats, other washers fitting into said recessed washers, and nuts adapted to the threaded stems and bearing upon said washers, substantially as specified.

9. A bicycle seat or saddle consisting of opposite supporting portions or seats each composed of wire bent to form an inner coil rigid against vertical pressure, and outer convolutions yielding to such pressure, and a strip or band crossing said inner coil and supported thereby, said strip providing a support for one of the tuberosities of the ischia of the rider, substantially as specified.

10. A bicycle seat or saddle having opposite supporting portions or seats each consisting of wire bent so as to form an inner coil rigid against vertical pressure, and outer convolutions yielding to such pressure, with strips or bands extending across said inner coils, and disposed at an angle so as to flare laterally from front to rear, substantially as specified.

11. A bicycle seat or saddle having opposite supporting portions or seats each consisting of wire bent to form an inner coil rigid against vertical pressure, and outer convolutions yielding to such pressure and strips or bands extending across said inner coils and dished or bent so as to project below the same, substantially as specified.

In testimony whereof I have signed my name to this specification in the presence of two subscribing witnesses.

ANDREW J. DOWNES.

Witnesses:
JOS. H. KLEIN,
F. E. BECHTOLD.